July 18, 1972   J. FLEURY   3,677,928
MACHINE FOR ELECTROCHEMICALLY MACHINING WORKPIECES
Filed July 20, 1970   2 Sheets-Sheet 2

United States Patent Office 3,677,928
Patented July 18, 1972

3,677,928
MACHINE FOR ELECTROCHEMICALLY
MACHINING WORKPIECES
Jean Fleury, Billancourt, France, assignor to Regie
Nationale des Usines Renault, Billancourt, France
Filed July 20, 1970, Ser. No. 56,473
Claims priority, application France, Aug. 19, 1969,
6928435
Int. Cl. B23p 1/04, 1/12
U.S. Cl. 204—224                                     10 Claims

ABSTRACT OF THE DISCLOSURE

A machine for electrochemically shaping workpieces, of the type comprising a vertical tool-electrode and a pressure chamber comprising a base member carrying the workpiece and a tool holder having formed therein at least one axial electrolyte passage duct, characterized in that the pressure chamber comprises a fixed roof formed with a central opening provided with a seal for the fluid-tight passage of a tool-holder sliding column and a vertically movable lateral wall surrounding said roof, said tool-electrode and said workpiece, means for sealing the joints on the one hand between the upper portion of said lateral wall and the outer edge of said roof, and on the other hand between the lower portion of said lateral wall and said base member.

---

Figure 1:
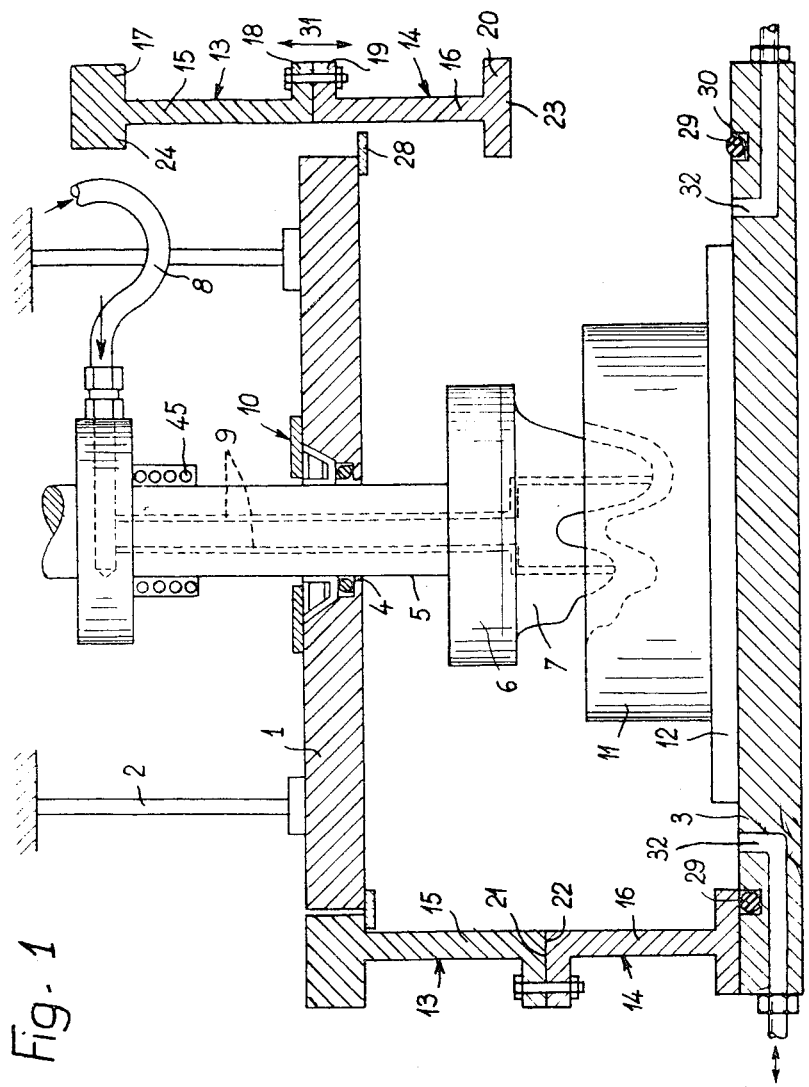

The present invention relates to electrochemical machining apparatus and has specific reference to an apparatus of this character which is usually referred to as a pressure-chamber machine.

In machines of this type it is known to keep the workpiece and the tool-electrode performing the machining operation proper in a fluid-tight enclosure in which the electrolyte necessary for this operation is fed retained and circulated under pressure, in order, inter alia, to avoid detrimental cavitation effects in the working zone.

However, this apparatus is attended by a serious inconvenience in comparison with electrochemical machining devices operating in the free atmosphere. During service operations, such as maintenance and repair works to be carried out within said enclosure, the upper, bell-like structure must be lifted; this assembly comprises side walls and a roof rigid therewith, the electrode secured to the operating piston sliding through said roof; the assembly further comprises various ancillary equipments such as slideways, pipe lines and conductors secured to the assembly. This operation is therefore slow and requires the use of considerable power; besides, it is attended by difficult problems concerning the necessary rigidity of the assembly. Therefore, these devices, which are mostly cumbersome, are characterized by a working chamber of relatively reduced dimensions.

Moreover, the assembly comprising the above-listed members and the working chamber or enclosure proper, which are necessarily movable, has such volume and weight that difficult problems concerning the guiding and fluid-tightness have to be solved. In fact, this considerable mass of suspended members is exposed to side thrusts causing severe stress to be applied to the sealing gaskets of the lower edge of the bell-like structure which engages the workpiece support, as well as to the seal or packing of the roof opening through which the electrode carrier extends.

It is the essential object of the present invention to provide a satisfactory solution to the problems set forth hereinabove, by providing an apparatus for electrochemical machining workpieces, which comprises a large-sized pressure chamber permitting an easy and rapid access to the members disposed within the machining enclosure while simplifying considerably the hoisting, guide and sealing means.

Moreover, this invention provides means for sealing said enclosure, more particularly between the electrode-supporting piston and the roof opening, with a view to increase the wear-resisting properties of the corresponding seal and also to permit the easy replacement of this seal without requiring the removal of bulky components.

It is thus clear that the present invention applies more particularly to an electrochemical machining apparatus comprising a pressure chamber, a workpiece supporting base member and a tool holder formed in its axial direction with at least one electrolyte circulation duct. This apparatus is characterized in that the pressure chamber comprises a fixed roof disposed in a plane normal to the piston axis and formed with an opening provided with a seal permitting the fluid-tight passage of the sliding column of the tool holder, and a movable lateral wall adapted to move parallel to the piston axis and surrounding said roof, tool-electrode and workpiece, adequate means being provided for sealing the joints between the upper edge of the lateral wall and the outer edge of the roof, on the one hand, and between the lower edge of said wall and said base member, on the other hand.

Said lateral wall will advantageously have a circular configuration, i.e. cylindrical or oval-sectioned.

According to a preferred form of embodiment of this invention, said lateral wall consists of superposed and assembled elements whereby, by properly selecting their heights, the operator can easily adapt the height of the chamber to that of the tool-electrode and the size of the workpiece to be mass-produced.

Figure 2:
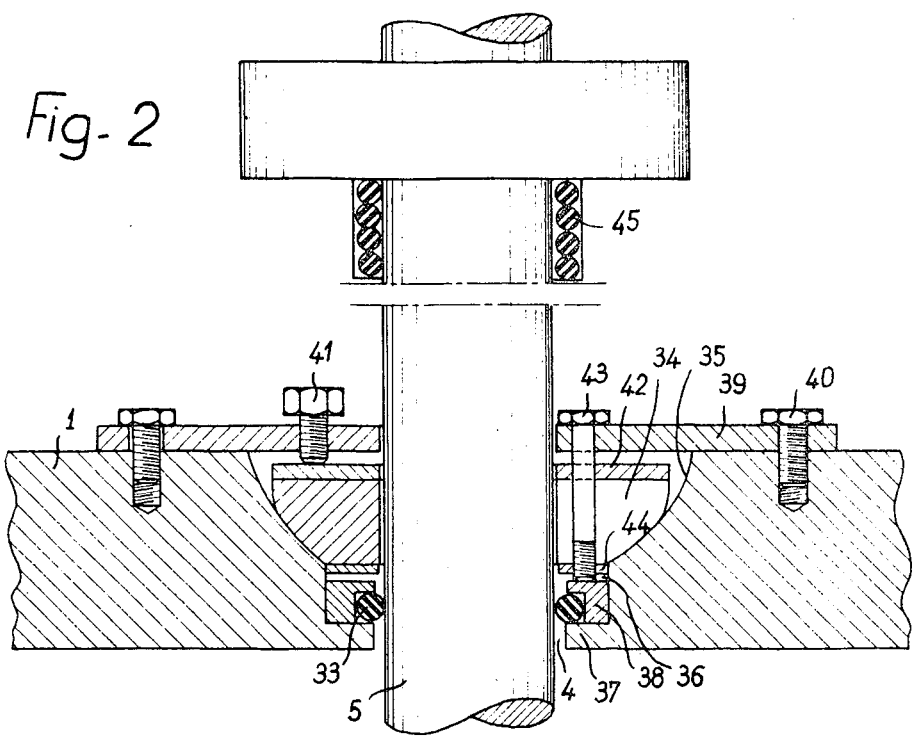
Figure 3:
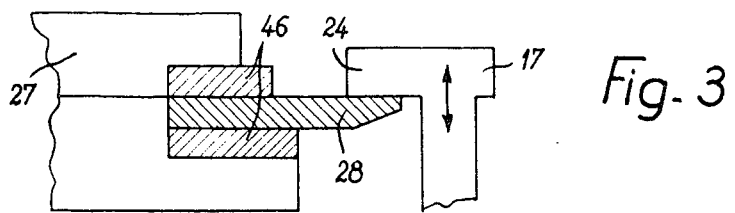

In order to afford a clearer understanding of the present invention a typical form of embodiment thereof will now be described with reference to the accompanying drawing illustrating diagrammatically:

In FIG. 1, a fragmentary section of an apparatus constructed according to the teachings of this invention;

In FIG. 2, a part-sectional view showing on a larger scale the fluid-tight passage of the tool-carrier column through the opening of the roof, in the machine illustrated in FIG. 1, and In FIG. 3, a detail of the joint formed between the side wall and the roof of the device.

As clearly shown in FIG. 1, only the essential component elements of an electrochemical machining apparatus are shown diagrammatically therein, namely a pressure chamber and the electrodes. In this figure the following elements have been omitted for the sake of clarity: the electrolyte storage tank, the delivery pump, the pipe lines of supplying and removing the electrolyte, the filter means, the heat exchangers for heating and/or cooling the electrolyte, the apparatus for evacuating the vapours generated by the electrolyte during the machining operation, the electric current source, the current lead-in means, the members for controlling the movements of the tool-electrode, the control instrument and apparatus and the hydraulic and electrical control means, and the frame structure of the assembly.

The pressure chamber comprises two sections, i.e. a fixed section and a movable section.

The fixed section comprises the roof 1 of the enclosure, secured or suspended through a number of supports 2 to or from the upper portion of the frame structure of the machine.

This roof 1 has formed therein a central opening 4 permitting the passage of the tool carrier column 5 comprising at its lower end a tool-supporting table 6 with the tool-cathode 7, and at its upper end a plate connected to the members (not shown) controlling the movements of the tool-cathode.

A hose 8 is connected to the tool carrier column and to valve means (not shown) for adjusting the output therein (i.e. valves and solenoid-operated valves controlled by a programme, or power-operated valves with automatic control means). This hose 8 communicates with electrolyte ducts 9 extending through the tool-cathode and opens into the lower ends of the projecting portions of the tool.

The opening 4 is provided with a packing 10 sealing the passage of column 5 as will be described presently with reference to FIG. 2.

The workpiece 11 to be shaped by the electrochemical process is supported by a base plate 12 connected to the + terminal and secured to the stationary base member 3 of the pressure chamber.

The movable section comprises independent and superposed elements 13 and 14 constituting the lateral wall of the pressure chamber, these elements having preferably a circular horizontal cross-section. The main body 15, 16 of these elements, for example of cylindrical configuration, consists of plastic material reinforced by wire windings, preferably in the form of a roving impregnated with synthetic resin, such as epoxy resin. It is obvious that the plastic material will be selected among those capable of resisting the corrosive action of the electrolyte.

The edges of the main bodies 15, 16 are reinforced by flanges 17, 18, 19 and 20 also consisting of a material capable of resisting the corrosive action of the electrolyte, such as stainless steel. The contact surfaces 21, 22 and 23 of flanges 17, 18 and 19 are adequately and carefully planed in order to ensure a proper assembling of the elements 13 and 14 either with each other and/or with the base member 3 of the device.

The flange 17 has an inner extension 24 forming a ledge adapted to engage a suitably shaped annular gasket 28 secured to the roof 1 by means of shims 46 permitting compensation of the dimensional differences (workpiece machining tolerances, etc.) and also adjustment of, up to a maximum of about 0.4", the vertical position of this gasket.

The flanges 18 and 19 extend only to the exterior and permit of assembling the various elements by means of bolts. Finally, the lowermost flange 20 constitutes the transverse arms of an inverted T-section member of which the vertical leg consists of the lower portion of the body 16. Thus this flange constitutes a circular foot bearing flat upon the base member 3 when the uppermost flange extension 24 engages the annular gasket 28. An O-ring 29 fitted in an annular groove 30 formed in the upper face of base member 3 co-acts with the lower face 23 of flange 20 to seal the joint. Thus, the pressure prevailing in the chamber is exerted on the inner upper face of flange 20 and on the lower face of annular gasket 28, so as to press the flange 20 against the base member 3 and the gasket 28 against the flange extension 24.

Of course, the number of elements may differ from that shown in the drawing, since the purpose of this variable number is to permit the adjustment of the height of the enclosure in proportion to that of the workpiece 11.

The lateral wall of this enclosure is connected to any suitable hoisting means permitting movement of said wall in the direction of the arrows 31 adjacent to the half-raised wall on the right-hand side of FIG. 1.

During the operation of the electrochemical machining apparatus the fluid-tight enclosure is pressurized by circulating therein, under predetermined conditions, the electrolyte fed from the shaping electrode 7 and discharged through ducts 32 formed through the base member 3. Of course, the electrolyte could be circulated as well in the reverse direction. It is clear that during the controlled attack of work-piece 11 by the electrolyte the wall elements 13 and 14 are in their lowermost position and bear on the seals 28 and 29 while compressing same.

At the end of a machining operation the lateral walls of the enclosure are raised to their uppermost position, so that easy access is permitted into the enclosure for replacing bulky members such as the workpiece 11 and shaping electrodes 7, and the enclosure can also be cleaned, if necessary.

FIG. 2 illustrates jointly a device for maintaining the fluid-tightness in a pressure chamber intended for machining large workpieces, and a device for renewing defective packings or seals.

Due to the considerable surface area of the workpieces the thrust exerted by the electrolyte on the component elements develops a relatively high stress, notably in the column 5 carrying the shaping electrode 7, at the level of its junction with the roof 1 of the pressure chamber. Certain forces are directed laterally and produce a moment at the level of the O-ring 33 of packing 10 (FIG. 1) which is therefore exposed to an abnormal wear, definitely greater than that produced when machining less bulky workpieces under pressure.

The solution brought to this problem according to this invention consists in providing a cylindrical guide or slide member 34 adapted to absorb in lieu of said O-ring 33 the lateral forces caused by the reaction of the thrust exerted by the electrolyte on the shaping electrode 7.

As shown in FIG. 2 the opening 4 formed through the roof 1 comprises firstly at the top a cavity 35 having substantially the shape of a spherical annulus and opening with its minor base into a cylindrical bore 36 comprising at its bottom an inner flange 37. The O-ring 33 is retained on this flange 37 by a rigid ring 38 engaging the cylindrical bore 36.

Fitted in said cavity 35 is a guide 34 of friction resisting material such as brass or a material coated or lined for example with polytetrafluoroethylene ("Teflon"), or alternately with a self-lubricating material such as porous bronze or sintered metal impregnated with a suitable lubricant.

This guide 34 consists of a ring having a substantially trapezoidal cross-sectional contour, made of several sections or segments so as to be easily removable. It is retained in the cavity 35 by means of a lock plate 39 consisting of several annular segments secured to the roof 1 of the pressure chamber by means of screws 40, and has screwed therein a plurality of lock screws 41 engaging an intermediate washer also consisting of a plurality of annular segments 42 rigid with the guide and permitting therefore an easy adjustment of the guide inclination and consequently of determining to a certain extent the inclination of the column 5 of tool holder 6.

Screws 43 extending through plain holes formed in the lock plate 39 and possibly the washer elements or segments 42, are screwed in small reinforcing plates 44 forming an integral part of the minor base of the component segments of guide 34, said screws 43 projecting somewhat below said plates 44. By bearing with their heads against the lock plate 39 and with their shanks against the ring 38, these screws 43 constitute convenient means for separating the guide 34 from cavity 35 during the disassembling operation for changing a seal or like work.

Thus, when a sufficient wear of the O-ring 33 is observed, the screws 41 are released and then, by tightening somewhat the screws 43 the component elements of guide 34 are detached from cavity 35. Then it is sufficient to release the screws 40 for removing from the opening 4 the lock plate 39 and the guide segments 34. Access is thus also had to ring 38 which can be raised to an intermediate position to free the O-ring 33, the latter being removed by tearing or cutting.

A number of reserve or spare O-rings 45 has previously been stored around the upper portion of column 5, the first O-ring 45 being then lowered to the position previously occupied by the worn O-ring 33 by sliding along the tool-holding column 5, after clearing the ring 38 by virtue of the resiliency of the O-ring material. The assembly is subsequently re-assembled by reversing the sequence of steps described hereinabove.

The above described guide is also advantageous in that it reduces the friction action against the tool-holding column 5 consisting in gneral of expoxy resin containing a silica filler in order to improve its wear-resisting properties.

Although the present invention has been described with reference to a single and preferred form of embodiment, it will readily occur to those skilled in the art that various modifications and changes may be brought thereto without departing from the spirit and scope of the invention as set forth in the appended clams.

What is claimed as new is:

1. A machine for electrochemically shaping workpieces, comprising a vertical tool-electrode, a pressure chamber comprising a base member adapted to carry a workpiece, and a tool holder having formed therein at least one axial electrolyte passage duct, wherein the pressure chamber comprises a fixed roof formed with a central opening, a joint for fluid-tight passage of a tool-holder sliding column through the opening in said roof, a vertically movable lateral wall surrounding said roof, means for sealing the joints between the upper portion of said lateral wall and the outer edge of said roof, and means for sealing the joints between the lower portion of said lateral wall and said base member.

2. A machine according to claim 1, wherein said movable lateral wall comprises superposed elements with at least one upper element and one lower element, said elements being adapted to be selected and assembled as a function of the height of the workpiece.

3. A machine according to claim 2, wherein each element comprises an oval-sectioned portion of plastic material reinforced by wire winding and has its upper and lower edges provided with reinforcing flanges.

4. A machine according to claim 3, wherein the joint between said roof and said lateral wall is sealed by an annular gasket which surrounds the edge of the roof and engages the lower inner face of the upper flange of the uppermost element and the joint between said base member and said lateral wall is sealed by the underface of the lower flange of the lowermost element with a flat surface registering with a corresponding flat surface formed on the upper face of said base member, an O-ring co-acting with one of these flat surfaces and being fitted in a groove formed in the other surface.

5. A machine according to claim 1, wherein the joint for the fluid-tight passage of said tool holder column comprises an O-ring fitting into the bottom of said opening, beneath a guide of friction-resistant material which is located in a corresponding cavity of said opening and is slidably engaged by said column, said guide comprising detachable segments of a ring element retained in said cavity by means of a lock plate also comprising annular segments secured individually to the top of said roof about said column.

6. A machine according to claim 5, wherein a spare O-ring is located in a waiting position about the upper portion of said column, so that it may be moved to a lower position along said column for replacing a defective or worn O-ring after removing said multi-element lock plate and guide.

7. A machine for electrochemically shaping a workpiece, comprising:
a vertically movable tool-electrode;
a vertically movable tool holder having an axial electrolyte passage duct therein;
a pressure chamber comprising a base member adapted to carry a workpiece, a fixed roof having a central opening therein in which said tool holder is slidably mounted, a joint between said roof and said tool holder for permitting fluid-tight passage of a column portion of said tool holder, a lateral wall surrounding said roof and vertically movable independently of said roof, base, and tool holder, means for sealing the joint between the upper portion of the lateral wall and the outer edge of said roof, and means for sealing the joint between the lower portion of the lateral wall and said base member;
wherein the central opening in said roof has circular cross-sections in planes substantially parallel to the plane of said roof, the smallest portion of said opening surrounded by an inner flange which is closest to the internal surface of said roof, above said inner flange said opening surrounded by a cylindrical surface which terminates at its upper extremity at a shoulder from which said central opening opens further, the cross-section of the further opening surfaces being arcuately concave, and terminating at the upper surface of said roof;
said joint for fluid-tight passage comprising an O-ring seated on the inner flange of said opening, a rigid ring engaging the cylindrical surface of said opening and retaining said O-ring in said opening, segments of friction resisting material surrounding the column portion of said tool holder and forming a guide ring of said material which is seated on the arcuately concave surfaces of said opening, and a lock plate which comprises a plurality of annular segments secured to the top of the roof and retaining said guide ring in said opening.

8. A machine according to claim 7, wherein said joint for fluid-tight passage additionally comprises reinforcing plates integral with the lower bases of the segments of friction resisting material, and said reinforcing plates have tapped holes therein and are connected to the lock plate by bolts freely extending through said lock plate and engaging said reinforcing plates in said tapped holes.

9. A machine according to claim 8, wherein said joint for fluid-tight passage additionally comprises segments of a washer plate forming a washer on top of the guide ring of friction resisting material under the lock plate.

10. A machine according to claim 7, wherein the upper edge of the lateral wall surrounding said roof has flanges and a T-shaped cross-section, and the lower face of the inner flange an the top portion of said lateral wall engages an annular gasket located between said flange and the edge of the roof, for sealing the joint between the roof and the lateral wall.

References Cited

UNITED STATES PATENTS

| | | | |
|---|---|---|---|
| 3,399,125 | 8/1968 | Mikoshiba et al. | 204—143 M |
| 3,409,535 | 11/1968 | Ross et al. | 204—224 |
| 3,467,593 | 9/1969 | Dickson et al. | 204—224 |
| 3,616,433 | 10/1971 | Williams | 204—225 X |

JOHN H. MACK, Primary Examiner

D. R. VALENTINE, Assistant Examiner

U.S. Cl. X.R.

204—225